United States Patent [19]
Korkowski et al.

[11] Patent Number: 5,432,875
[45] Date of Patent: Jul. 11, 1995

[54] FIBER OPTIC MONITOR MODULE

[75] Inventors: Jeff L. Korkowski, Bloomington; David J. Emmons, Plymouth, both of Minn.

[73] Assignee: ADC Telecommunications, Inc., Minneapolis, Minn.

[21] Appl. No.: 20,070

[22] Filed: Feb. 19, 1993

[51] Int. Cl.6 .............................. G02B 6/28; G02B 6/38
[52] U.S. Cl. .......................................... 385/27; 385/24; 385/31; 385/39; 385/47; 385/55; 385/59; 385/89; 385/139; 385/140; 359/109; 359/127; 359/154
[58] Field of Search ............... 455/600, 601, 612, 618, 455/619; 385/27, 15, 16, 24, 30, 31, 39, 42, 44, 46, 47, 48, 88, 89, 92, 134, 135, 139, 140, 55, 71, 72, 76, 77, 59; 359/109, 117, 118, 125, 127, 152, 154, 173, 180, 189

[56] References Cited
U.S. PATENT DOCUMENTS

| | | | |
|---|---|---|---|
| 4,728,171 | 3/1988 | Schofield et al. | 385/81 |
| 4,971,421 | 11/1990 | Ori | 385/95 |
| 4,982,083 | 1/1991 | Graham et al. | 385/140 X |
| 5,090,792 | 2/1992 | Koht et al. | 385/135 X |
| 5,109,467 | 4/1992 | Hogan et al. | 385/135 |
| 5,111,519 | 5/1992 | Mathis | 385/140 X |
| 5,127,082 | 6/1992 | Below et al. | 385/135 |
| 5,133,038 | 7/1992 | Zipper | 385/135 |
| 5,212,761 | 5/1993 | Petrunia | 385/135 |
| 5,231,687 | 7/1993 | Handley | 385/139 |
| 5,276,701 | 1/1994 | Shirasaki | 385/140 X |

Primary Examiner—Brian Healy
Attorney, Agent, or Firm—Merchant, Gould, Smith, Edell, Welter & Schmidt

[57] ABSTRACT

A fiber optic connector module includes a beam splitter for directing 10 percent of a fiber optic signal to a monitor connector. The input of the beam splitter is passed through a variable attenuator. By monitoring at the monitor connector, the variable attenuator can be adjusted utilizing the known split ratio of the beam splitter to achieve a desired dynamic range of the optical signal leaving the module.

8 Claims, 2 Drawing Sheets

5,432,875

FIBER OPTIC MONITOR MODULE

BACKGROUND OF THE INVENTION

1. Field of the Invention

This invention pertains to signal or data transmission through fiber optic cables. More particularly, this invention pertains to a connector module with monitoring capabilities for use in such a transmission system.

2. Description of the Prior Art

The telecommunications and data transmission industries are rapidly expanding their development of fiber optic transmission systems. Historically, telecommunications signals and data have been transmitted over wire lines such as twisted pair wire or coaxial cables. In order to accommodate higher signal rate speeds, the industry is turning to increased use of fiber optic cables as the transmission medium.

As the use of fiber optic cables increases, the need for peripheral equipment has increased. For example, it is desirable to have access to a fiber optic line for the purpose of either rerouting the line in the event of damage to the line or to have access to the line for purposes of monitoring or testing the line.

Fiber optic peripheral equipment for cable management, cable storage and connection capabilities are well known. The use of modular fiber optic connector modules is known for performing so-called cross connect applications. In FIG. 1 of the present application, an optical cross connect module of the prior art is shown. With reference to that figure, the module 10 includes a housing 12 which contains a 2-by-4 fiber optic switch 14 and a fiber optic beam splitter 16. A transmit fiber optic connector 18 and a receive fiber optic connector 20 are secured to the back panel 22 of the housing 12. On the front panel 24 of the housing, the fiber optic connectors 26, 28, 30, 32 and 34 are secured to provide transmit line monitoring, transmit line access, receive line access, transmit line cross-connect and receive line cross-connection, respectively. The splitter 60 receives a signal beam from the transmit connector 18 along a fiber optic cable 36. The splitter 16 directs ten percent of the beam to the monitor connector 36 along the cable 38. The remaining ninety percent of the beam is directed to a fiber optic cable 40.

By rotation of knob 42, an operator can actuate switch 14 to connect cable 40 to either of cables 44,46. Cable 44 is optically connected to connector 28. Cable 46 is optically connected to connector 32. A cable 48 is connected to connector 20. Actuation of the switch 14 results in cable 48 being connected to either of cables 50 or 60 which are connected, in turn, to connectors 30,34. By reason of this structure, with the switch 14 shown in the position of FIG. 1, the normal signal path is from connectors 18,20 to connectors 32,34, respectively. Upon actuation of the switch 14 by turning of knob 42, connection from connectors 18,20 is shifted to connectors 28,30. Connector 26 in combination with beam splitter 16 permits monitoring of the signal along the transmit cable 40 without interruption of the signal.

Connectors 26, 28, 30 are normally not connected to an external cable. Accordingly, to prevent back reflection, the cable connectors 26, 28 and 30 have, in the prior art, been so-called angled connectors to prevent back reflection.

Modules such as module 10 may be utilized for cross-connecting or interconnecting a variety of fiber optic equipment. Equipment which receives a fiber optic signal typically has a signal power window or range for signals to be received by the equipment. For example, a piece of equipment might require that an incoming fiber optic signal be received at −25 db þ 5 dbm. The use of splitters 16 in the module 10 of FIG. 1, can result in a power variation. Accordingly, the power of the signal through the module 10 may be sufficiently modified that it is no longer within the desired power window for downstream equipment.

It is an object of the present invention to provide a fiber optic connector module which permits monitoring of a signal while insuring that the signal leaving the module will be within a desired power range for downstream equipment.

SUMMARY OF THE INVENTION

A fiber optic connector module is disclosed having a housing defining an interior. A plurality of connectors are carried on the housing each having free ends exposed to an exterior of the housing for connection to external fiber optic cables. The plurality of fiber optic connectors includes a first and second transmit connector, a first and second receive connector and a receive monitor connector. A transmit fiber optic cable is contained within the interior and connects the first and second transmit connectors. A receive fiber optic cable is contained within the interior and connects the first and second receive connectors. A receive monitor cable is carried within the interior and is connected to the receive monitor connector. A beam splitter is carried within the housing and splits a beam from the first receive connector into a first and second distribution beam with the first distribution beam directed to the second receive connector and with the second distribution beam directed to the receive monitor connector. An attenuator is connected within the housing for attenuating a signal from the first receive connector to the beam splitter.

DESCRIPTION OF THE PREFERRED EMBODIMENT

Figure 1:
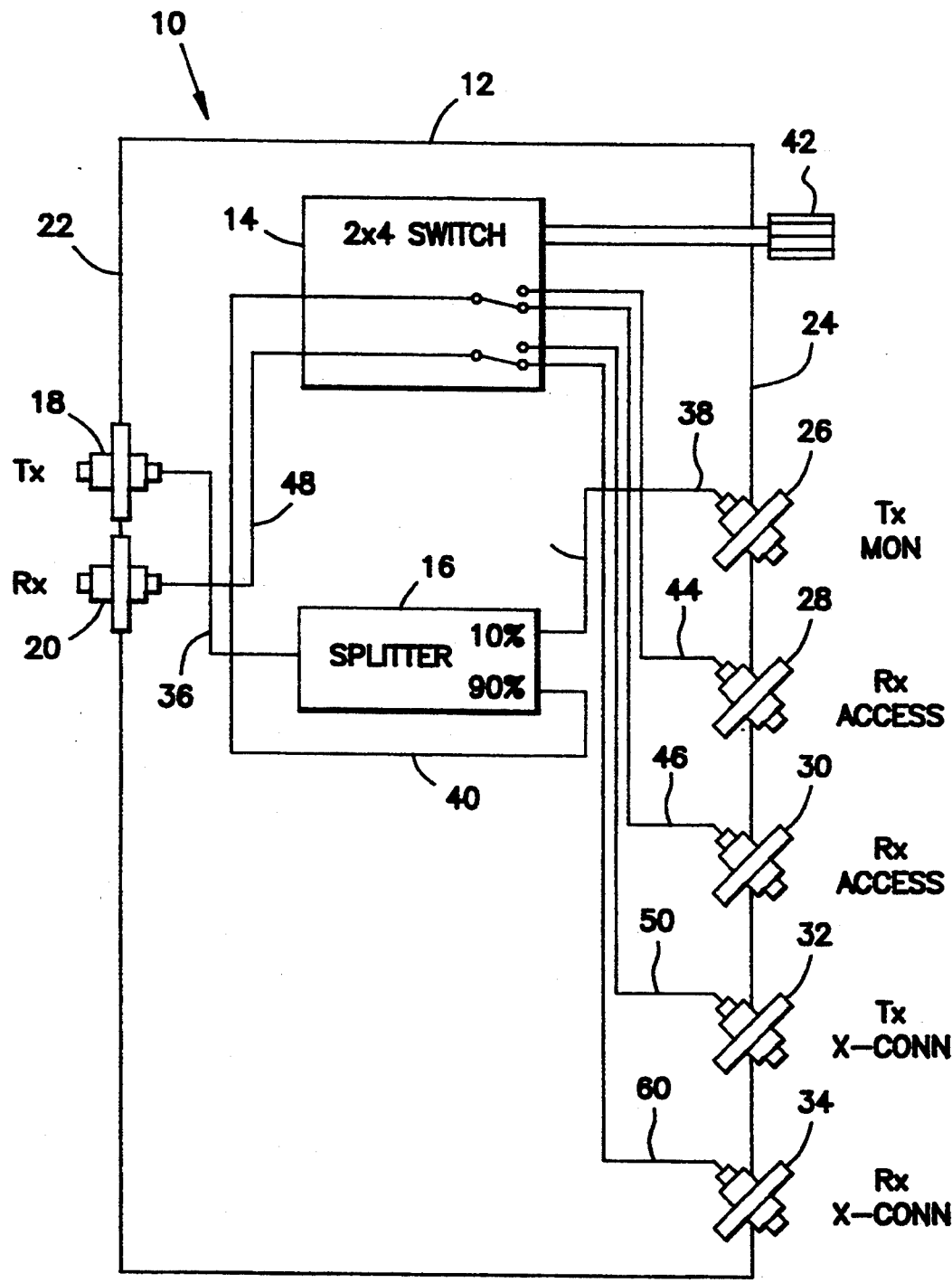
FIG. 1 is a schematic representation of a prior art optical DSX circuitry for an optical DSX module.

Referring now to the several drawing figures in which identical elements have been numbered identically throughout, a description of the preferred embodiment of the invention will now be provided. FIG. 1 shows a prior art fiber optic module which is discussed more thoroughly in that section of this application entitled "Description of the Prior Art."

Figure 2:
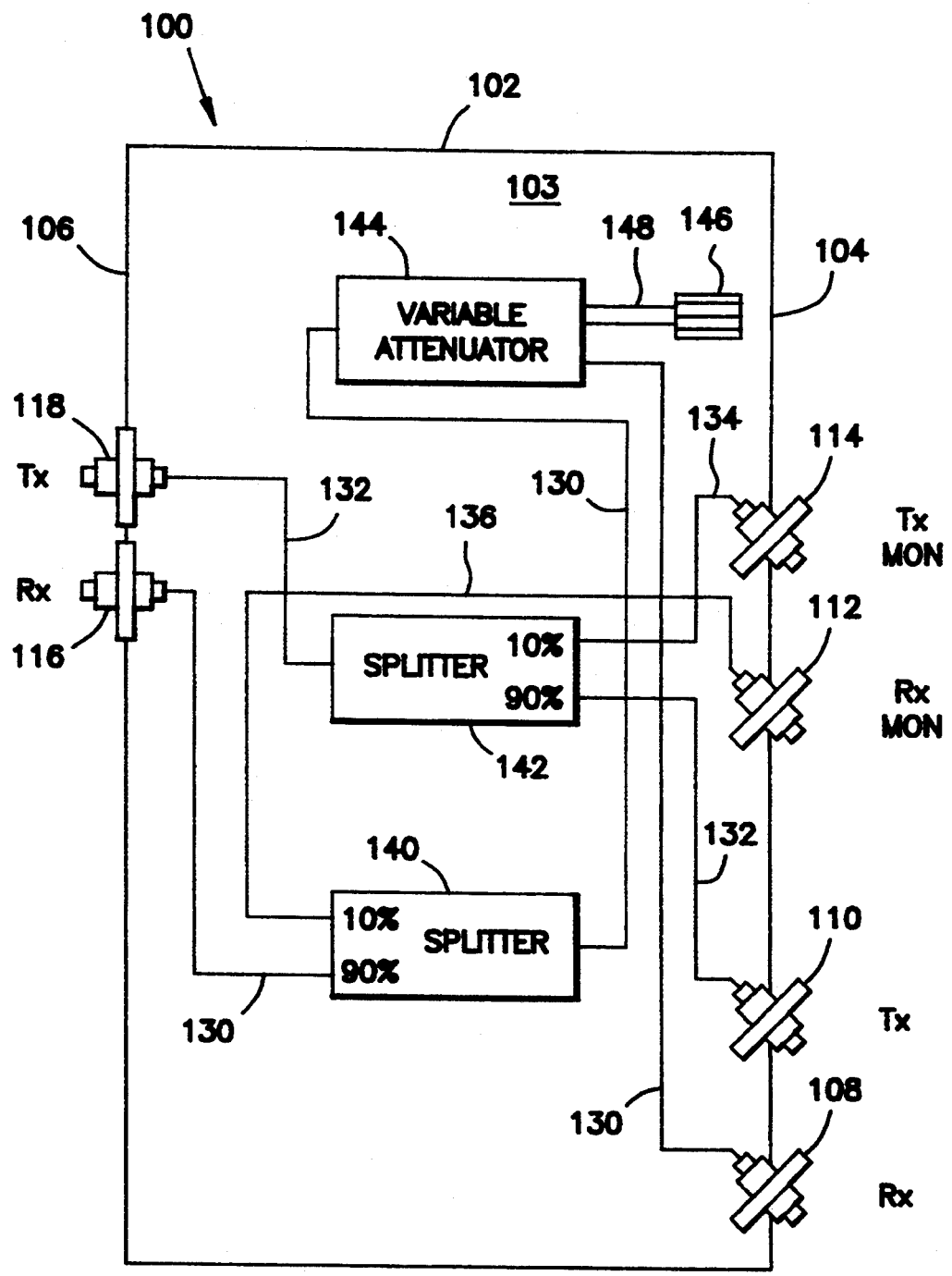
FIG. 2 is a schematic representation of a fiber optic monitor module according to the present invention.

With reference directed to FIGS. 2–3, a connector module 100 is shown having a sheet metal housing 102 which includes a front wall 104 and a rear wall 106. The front wall carries a first receive fiber optic connector 108, a first transmit fiber optic connector 110, a receive monitor connector 112 and a transmit monitor connector 114. The rear wall 106 carries a second receive fiber optic connector 116 and a second transmit fiber optic connector 118. It will be appreciated that fiber optic connectors such as connectors 108, 110, 112, 114, 116 and 118 are well known in the art and form no part of this invention per se. Connectors 108, 110, 112 and 114 are secured with their axes at an angle relative to the face 104. For reasons that will become apparent, connectors 112,114 are preferably so called angled connectors to prevent back reflection. Namely, the terminal face of the connector is non-orthogonal to the axis of the fiber contained within the connector ferrule 124. By reason of this angle, light transmitted through the fiber does not reflect back into the fiber when a second cable is not connected to the connector. The preferential use of an angled connector for connectors 112,114 is attributable to the fact that in normal operation, it is anticipated that fibers will not be connected to the free ends of connectors 112,114. In anticipated operation, external cables will be connected to connectors 108, 110, 116 and 118. Accordingly, these connectors need not be angled connectors.

Each of connectors 108, 110, 112, 114, 116 and 118 have free ends 108a, 110a, 112a, 114a, 116a and 118a exposed external to an interior 103 of housing 102 to permit connection to external cables (not shown).

A receive fiber optic cable 130 is provided contained within interior 103 and optically coupled to first receive connector 108. The receive cable 130 is also connected to second receive connector 116. A transmit fiber optic cable 132 is optically connected to the first transmit fiber optic connector 110. Cable 132 is also connected to the second transmit fiber optic connector 118.

A transmit monitor fiber optic cable 134 is optically connected to the transmit monitor connector 114. Similarly, a receive monitor fiber optic cable 136 is optically connected to the receive monitor fiber optic connector 112.

A first beam splitter 140 is provided on cable 130 to split a receive signal beam from receive connector 108 into first and second receive distribution beams. The first receive distribution beam is transmitted along cable 130 to connector 116. The second receive distribution beam is transmitted along cable 136 to connector 112. For reasons that will be described, first beam splitter 140 preferably splits the receive signal with ninety percent of the signal transmitted to connector 116 and the remaining ten percent of the signal transmitted to connector 112. Similarly, a second beam splitter 142 is provided on cable 132. The splitter 142 is selected to send 90 percent of the signal from connector 118 through cable 132 to connector 110. The remaining 10 percent of the signal is distributed through cable 134 to connector 114.

A variable attenuator 144 is provided on cable 130. The variable attenuator is selectively actuated by an operator by means of rotation of a handle or knob 146 extending beyond face 104. The knob 146 is connected via a shaft 148 to the attenuator 144. Upon turning of the knob 146 attenuation of a signal along cable 130 may be varied. It will be appreciated that beam splitters and variable attenuators such as those schematically shown in FIG. 2 are commercially available and well known.

With the structure thus described, a signal is received into module 100 through connector 108. The signal is attenuated through variable attenuator 144 and passed to first splitter 140. Ninety percent of the signal is emitted from module 100 through connector 116. Ten percent of the signal is directed to monitor connector 112. Similarly, a signal is inputted at connector 118 and passed through splitter 142 with 90 percent of the signal sent to connector 110 and the remaining 10 percent directed to connector 114. In intended use, connectors 110, 108, 116 and 118 are connected to fiber optic cables connecting various pieces of fiber optic equipment. At an operator's election, fiber optic cables may be connected to either of connectors 112,114 to monitor the signal passing through lines 130,132, respectively.

In intended operation, connector 116 is connected via a fiber optic cable (not shown) to a piece of fiber optic equipment. Such equipment typically has a limited dynamic range for receiving signals. For example, such a dynamic range may be −25 db þ 5 dbm. By monitoring through connector 112, an operator can determine if the signal beam discharged through connector 116 is within the prescribed dynamic range. For example, due to the 90/10 split of first splitter 140, if the dynamic measurement at connector 112 is measured at −35 dbm then an operator knows that the output of connector 116 is −25 dbm. If the measured power at connector 112 is other than −35 dbm, the operator can manually engage knob 146 and vary the attenuation of attenuator 144 until the measured dynamic output of connector 112 attains the desired −35 dbm.

The use of a 90/10 splitter 140 is desirable as compared to other types of splitters (for example, 80/20 splitters) since an operator can readily determine the amount of attenuation necessary. Specifically, a ninety percent splitter results in a 10 db loss. A fifty percent splitter results in a 3 db loss. Using a 90/10 splitter, an operator readily knows that the db output of connector 116 is +10 at measured at connector 112.

From the foregoing detailed description of the present invention, it has been shown how the objects of the invention have been attained in a preferred manner. However, modifications and equivalence of the disclosed concepts such as those which readily occur to one skilled in the art are intended to be included within the scope of the present invention.

We claim:

1. A fiber optic connector module comprising:
   a housing defining an interior;
   at least a first and a second transmission fiber optic connector, each having a free end for releasable connection to a first and second, respectively, external fiber optic cable, said first and second transmission fiber optic connectors carried on said housing with said free ends exposed to an exterior of said housing;
   a transmission fiber optic cable carried within said interior and optically connected to said first and second transmission fiber optic connectors;
   at least a first and second reception fiber optic connector, each having a free end for releasable connection to a third and a fourth, respectively, external fiber optic cable, said first and second reception fiber optic connectors carried on said housing with said free ends exposed to an exterior of said housing;
   a reception fiber optic cable carried within said interior and optically connected to said first and second reception fiber optic connectors;
   at least a monitoring reception fiber optic connector having a free end for releasable connection to a fifth external fiber optic cable, said monitoring reception connector carried on said housing with said free end exposed to an exterior of said housing;
   at least a monitoring reception fiber optic cable contained within said housing and optically connected to said monitoring reception fiber optic connector;
   at least a first beam splitter operably connected to said reception fiber optic cable to split a signal from said first reception fiber optic connector into first and second distribution beams with said first distribution beam distributed along said reception fiber optic cable to said second reception fiber optic connecter and with said second distribution beam directed along said monitoring reception fiber optic cable to said monitoring reception fiber optic connector; and attenuation means for attenuating an optical signal directed along said reception fiber optic cable from said first reception fiber optic connector to said first beam splitter.

2. A fiber optic connector module according to claim 1 wherein said first and second distribution beams are split from said signal beam as a predetermined percentage of said signal beam.

3. A fiber optic connector module according to claim 2 wherein said first distribution beam is 90 percent of said signal beam and said second distribution beam is 10 percent of said signal beam.

4. A fiber optic connector module according to claims 1, 2 or 3 wherein said attenuation means includes means for variably selecting an attenuation of a signal passing through said attenuation means with an amount of said variation selectable by an operator.

5. A fiber optic connector module according to claim 1 wherein said monitoring reception fiber optic connector includes means for preventing reflection of a beam into said monitoring reception fiber optic cable when said monitoring reception fiber optic connector is disconnected from said fifth external fiber optic cable.

6. A fiber optic connector module according to claim 5 wherein said free end of said reception fiber optic connector includes an optical fiber terminating at a terminal face which is non-orthogonal to an axis of said optical fiber.

7. A fiber optic connector module according to claim 1 further comprising a monitoring transmission fiber optic connector having a free end for releasable connection to a sixth external fiber optic cable, said monitoring transmission fiber optic connector carried on said housing with said free end exposed to an exterior of said housing;

a monitoring transmission fiber optic cable contained within said interior and optically connected to said monitoring transmission fiber optic connector;

a second beam splitter operably connected to said transmission fiber optic cable to split a transmission signal beam from said first transmission fiber optic connector into a first and second transmission distribution beam with said first transmission distribution beam directed along said transmission fiber optic cable to said second transmission fiber optic connector and with said second transmission distribution beam directed along said monitoring transmission fiber optic cable.

8. A fiber optic connector module according to claim 7 wherein said monitoring transmission fiber optic connector includes means for preventing reflection of a signal into said monitoring transmission fiber optic cable when said monitoring transmission fiber optic connector is disconnected from said sixth external fiber optic cable.

* * * * *